United States Patent
Raybon

[11] 3,799,512
[45] Mar. 26, 1974

[54] GAS-LIQUID MIXING APPARATUS

[75] Inventor: Charles L. Raybon, Riverside, Calif.

[73] Assignee: Bruce E. Echols, Riverside, Calif.

[22] Filed: Jan. 10, 1972

[21] Appl. No.: 216,469

[52] U.S. Cl. ............ 261/29, 23/260, 55/240, 261/111, 261/113
[51] Int. Cl. ............................................ B01d 47/06
[58] Field of Search ............ 261/108–113, 261/24, 28, 29; 55/240, 241, 51, 226; 23/283, 260

[56] References Cited
UNITED STATES PATENTS

| | | | |
|---|---|---|---|
| 2,531,773 | 11/1950 | Greer | 261/28 X |
| 3,013,781 | 12/1961 | Haselden | 261/112 |
| 3,648,440 | 3/1972 | Egan | 261/109 X |
| 3,218,046 | 11/1965 | Miers | 261/109 X |
| 2,332,527 | 10/1943 | Pyzel | 23/260 |

FOREIGN PATENTS OR APPLICATIONS

| | | | |
|---|---|---|---|
| 341,147 | 9/1921 | Germany | 261/112 |

*Primary Examiner*—Frank W. Lutter
*Assistant Examiner*—William Cuchlinski, Jr.
*Attorney, Agent, or Firm*—Herbert E. Kidder

[57] ABSTRACT

An enclosed chamber having a plurality of horizontally extending, parallel baffles arranged in rows of vertically spaced and vertically aligned baffles. The baffles of one row are offset midway between the corresponding baffles of the next adjacent rows on either side. The tops of the baffles slope downwardly on opposite sides and terminate in lateral extremities which lie in substantially the same vertical plane as the lateral extremities on the near side of the next adjacent row. Vertical screens extend downwardly between rows of baffles, touching the adjacent lateral extremities of the baffles on both sides. Liquid is cascaded down through the chamber, falling from one baffle in one row onto the next lower baffles of adjoining rows, and passing alternately through the screens first in one direction and then the other. At the same time, gas is blown upwardly through the chamber, traveling in a serpentine path around the baffles and through the spaces between them, passing back and forth from one row to the other and back again, picking up droplets of liquid cascading from the baffles and down the screen, and churning them around in a vigorous rolling and tumbling action. At the top of the chamber, any entrained droplets of liquid are separated out from the gas in a de-misting section.

8 Claims, 4 Drawing Figures

PATENTED MAR 26 1974 3,799,512

GAS-LIQUID MIXING APPARATUS

BACKGROUND OF THE INVENTION

The present invention pertains to gas-liquid mixing apparatus of the type used in cooling towers, air scrubbers, liquid-phase reaction chambers, and the like, wherein a gas and liquid are intimately mixed in a highly turbulent condition, so that any reaction between them, whether physical or chemical, is greatly accelerated and carried to its maximum development. Such apparatus is widely used for water and waste water aeration; for scrubbing of recirculated and make-up air for hospitals and other large buildings; for cleansing stack emissions of steel plants, power plants and other smaller industries; for cooling towers in petro-chemical complexes; large refrigeration plants, electric power plants, and the like; and for reaction towers in chemical manufacturing plants using adsorption or desorption processes.

Prior art gas-liquid mixing devices of the character described above have, almost without exception, been extremely large, heavy, and expensive to build and operate, considering the output capacity of the devices.

SUMMARY OF THE INVENTION

The present invention is a new and improved counterflow gas-liquid mixing apparatus with mechanically induced or forced, draft, characterized by extremely high efficiency, maximum output capacity for a given power input, and a compact, relatively inexpensive and lightweight structure.

The primary object of the invention is to provide a gas-liquid mixing cell in which the gas and liquid are intimately mixed in a churning, tumbling action that breaks up the liquid into countless tiny droplets which coalesce and then are broken up again, producing a maximum of surface contact area between the liquid and the gas, all in an apparatus of extremely compact size.

Another object of the invention is to provide a gas-liquid mixing cell of the class described, which has a very low pressure drop in the gas that passes through the apparatus, and therefore a correspondingly low power consumption.

Another object of the invention is to provide a gas-liquid mixing apparatus which requires a minimum of engineering for each installation; which is easy to fabricate from standard, readily available materials; and which does not require a great deal of tooling to manufacture.

Still a further object of the invention is to provide a gas-liquid mixing apparatus which is capable of being used in many different modes of operation, and which can therefore be adapted to a wide range of different processes using adsorption, desorption, or heat transfer. For example, in one embodiment of the invention, a gas-liquid mixing cell of the type shown and described herein is embodied in a chemical reaction system, wherein gas and liquid are constantly recirculated in a closed circuit, with make-up gas and liquid added to the system as they are consumed, and with the reaction product removed from the system as it reaches a predetermined level of concentration.

The objects are achieved in the present invention by means of a plurality of horizontally extending, parallel baffles arranged in rows of vertically spaced and vertically aligned baffles within an enclosed chamber. The baffles of one row are offset from the corresponding baffles of the next adjacent rows on either side, so that each baffle in one row lies midway between the baffles on either side thereof. The baffles are made with their top sides sloping downwardly on either side, so that liquid falling on the baffle is shed to either side. The bottom edge of the sloping side forms a lateral extremity of the baffle, and the lateral extremities on one side of a row of baffles lies substantially in the vertical plane of the lateral extremities on the near side of the next adjacent row of baffles. Extending vertically between adjacent pairs of rows are screens which touch the adjacent lateral extremities of the baffles on both sides thereof. Liquid is pumped into the upper part of the cell (preferably through the interior of the topmost baffles) and is discharged onto the screens near the top edges thereof. At the same time, gas is pumped into the bottom end of the chamber and passes upwardly through the baffles, being deflected first in one direction and then the other by the baffles, so that the gas passes back and forth through the screen as it ascends through the baffles. The liquid cascading down from the top of the mixing cell is picked up by the high velocity stream of gas and blown into countless tiny droplets which churn around in a tumbling turbulent mass that is carried along with the gas stream for a short distance. As the liquid drops out of the gas, it flows down the screen or drops onto the baffle below it, and thence runs off onto the screen, where it is picked up again by the gas stream. In passing back and forth through the screens along the serpentine pathway defined by the staggered rows of baffles, the gas with its entrained droplets of liquid forms a series of rolling, churning masses which promote the most intimate mixing of liquid and gas.

These and other objects and advantages of the invention will become apparent to those skilled in the art from the following detailed description of the preferred embodiments thereof, with reference to the accompanying drawings.

DESCRIPTION OF THE PREFERRED EMBODIMENTS

Figure 1:
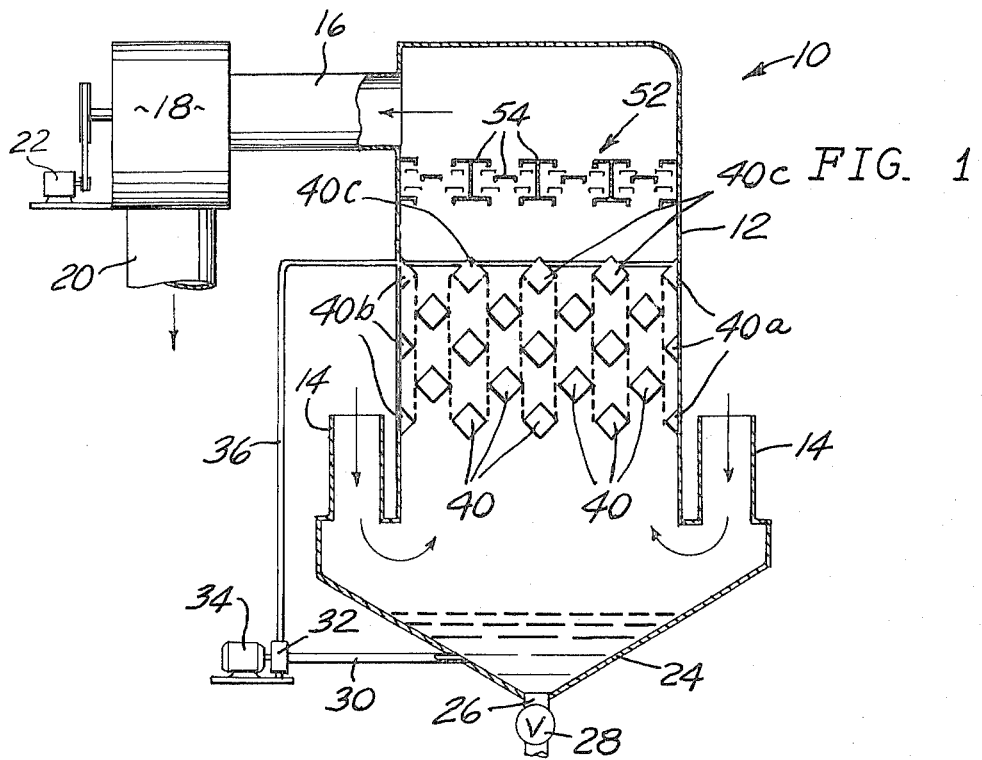
FIG. 1 is a vertical section through a multi-cell gas-liquid mixing apparatus embodying the invention.

In FIG. 1, the gas-liquid mixing apparatus of the invention is designated in its entirety by the reference numeral 10, and comprises an enclosed housing 12 having gas inlet ducts 14 and outlet duct 16. A blower 18 has its inlet connected to the duct 16, and its outlet connected to a conduit 20, said blower being driven by a motor 22 through a V-belt and pulley. The apparatus 10 is of the type wherein the gas passes only once through the housing 12, which is characteristic of cooling towers, air scrubbers, and stack emissions cleansers, for which the invention is particularly well-suited. In the case of an air-scrubber, the discharge conduit 20 might be connected to the ventilation system of a large building; whereas for a cooling tower or stack emissions cleanser, the blower 18 would discharge to the atmosphere.

The bottom of the housing 12 forms a sump 24 in which the liquid collects after cascading down through the unit, and at the bottom of the sump is an outlet 26 having a valve 28. Also connected to the sump 24 near the bottom thereof is an intake pipe 30, which goes to a pump 32 driven by a motor 34. The pump 32 discharges the water or other liquid through a pipe 36, which extends up to the upper portion of the housing 12, where it is distributed through branch pipes 38 to the top baffles of the system, as will now be described.

Contained within the housing 12 is a plurality of horizontally extending, parallel baffles 40 which are arranged in rows of vertically spaced and vertically aligned baffles. Preferably, the baffles 40 are in the form of square tubes of thin wall stainless steel, which might typically measure 3 or 4 inches wide on each side. However, the invention is not limited to square tube baffles, but might take various other cross-sectional shapes such as hexagon, triangle, or circular; nor is the invention limited to stainless steel. The baffles 40 may be made of any suitable material which will stand up to the use for which it is intended.

The baffles 40 of one row are offset vertically from the corresponding baffles of the next adjacent rows on either side, so that each baffle in one row lies midway between the baffles on either side thereof. The square tubes 40 are turned so that their top sides 42 and 43 slope downwardly on either side, and this causes any liquid falling on the baffle to be shed to either side. The corners of the square tubes at the bottom of the sloping sides 42, 43, form lateral extremities 44.

Figure 2:
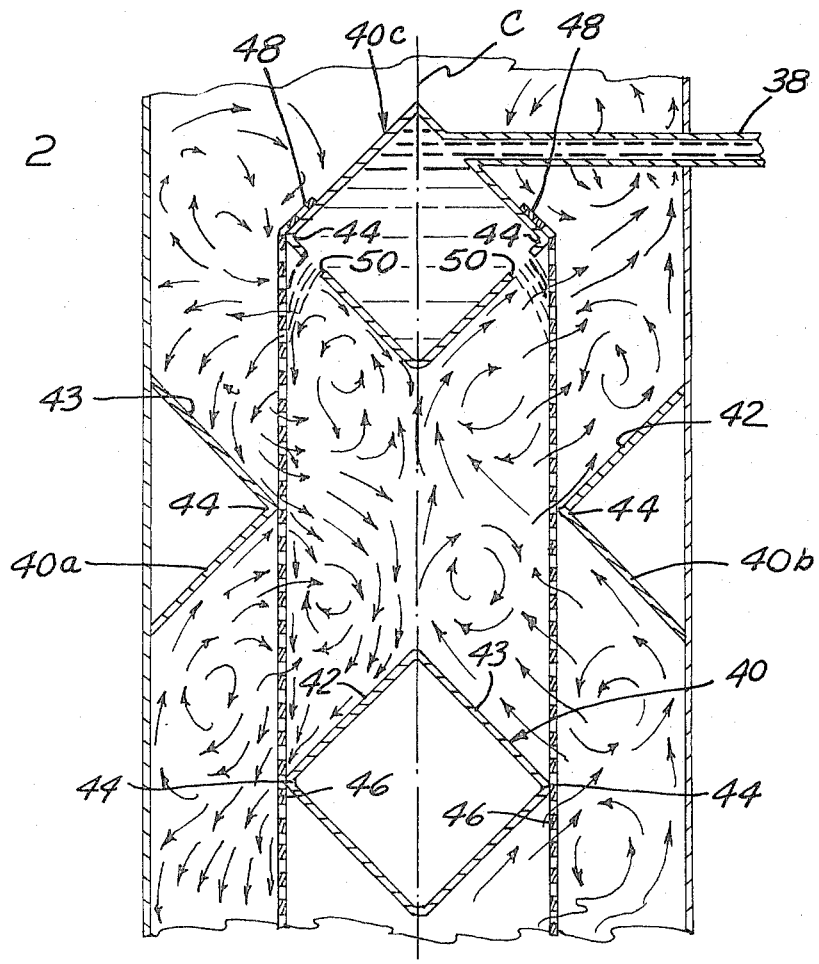
FIG. 2 is an enlarged fragmentary sectional view, taken through a single gas-liquid mixing cell at the upper end thereof, the arrows in the left-hand side of the centerline depicting the circulation of liquid droplets cascading down through the unit, and the arrows on the right-hand side of the centerline depicting the circulation of the gas ascending through the unit.

Fixed to the inner surfaces of the housing 12 on opposite side walls thereof are two vertical rows of baffles 40a and 40b, each baffle of which is triangular in cross-section, as best seen in FIG. 2. Each of the baffles 40a, 40b, is in effect, one-half of a square tube 40, the top sides 42 and 43 of which slope downwardly and inwardly, and terminate in lateral extremities 44. The lateral extremities 44 on one side of the baffles in one row line in substantially the same vertical plane as the lateral extremities 44 on the near side of the next adjacent row of baffles, and extending down between adjacent pairs of rows are screens 46 which touch the adjacent lateral extremities of the baffles on both sides thereof. Each of the screens 46 is preferably in the form of a perforated plate or sheet of stainless steel, having circular holes on the order of ⅛-inch or ¼-inch diameter, spaced apart 3/16 or ⅜-inch, respectively, on centers. At their top ends, the screens 46 have narrow flanges 48 bent over at a 15° angle to overlie the sloping sides of the top baffles 40c. The flange 48 supports the screen 46 on the top baffle 40c, and prevents the screen from dropping down into the sump.

The top baffle 40c of each row serves as a liquid manifold, and to that end, the interior of the baffle is connected to the branch pipe 38 of the water pump. Formed in the underside of the baffle just below the lateral extremities 44 on either side thereof are lines of discharge orifices 50, through which streams of liquid pour out onto the screens 46 and run down the latter.

The operation of the invention is as follows: Air (or other gas) is drawn or discharged upwardly through the assemblage of baffles 40 at high velocity by the blower 18, and is deflected first in one direction and then the other by the baffles as it follows the serpentine path defined by the staggered rows of baffles; passing back and forth through the screens 46 each time that the air is reversed in direction. At the same time, water (or other liquid) is pumped into the top baffle 40c by the pump 32, and pours out of the openings 50 onto the screen. As the water streams down the screens 46, it is picked up by the high velocity streams of air and is blown into countless tiny droplets, which churn around in rolling, tumbling, turbulent masses. Some of the water droplets strike the baffles or screens and run down the same until the water is again picked up by the airstream and blown into droplets. Other droplets fall out of the air and run down the sloping top sides 42, 43 of the baffles in streams that pour through the screen into the airstream rising from below. The paths followed by the droplets of water and streams of water as they cascade down through the mixing cell are shown by the arrows on the left-hand side of the centerline C in FIG. 2. The arrows on the right-hand side of the centerline C show the paths taken by the airstream, and the circular groups of arrows designate regions where the rolling, churning action takes place. It will be noted that the arrows on the left-hand side (denoting liquid) are often headed in the opposite direction of the arrows on the right-hand side (denoting gas) at the same location. This counter-flow action contributes to the turbulence and to the breakup of the liquid into small droplets, and increases the overall effectiveness and efficiency of the gas-liquid mixing cell.

Air coming out of the top of the baffle assemblage carries with it a certain amount of entrained moisture in the form of extremely tiny droplets, and these are separated out of the air in the de-mister section 52. The demister section 52 is an impingement separator comprising a plurality of large, flat plates 53 supported horizontally in spaced apart, side-by-side relationship at several different levels. In this upper portion of the housing 12, the velocity of the air is slowed down, and in passing upwardly through the plates 54, the airstream is directed against the undersides of the plate. The momentum of the entrained liquid droplets causes them to impinge on the surface of the plates and to collect into large drops which fall back down onto the baffles. The side edges of the plates 54 are preferably bent downwardly, as shown in FIG. 1, to form the plates into shallow, inverted channels.

By way of illustration, a gas-liquid mixing apparatus of the type shown in FIG. 1 has been found to operate extremely satisfactorily with a water flow of 20 gallons perminute per foot of width of the baffle assemblage, and with an air flow of 500 cubic feet per minute. This was done with a gas-liquid mixing cell in which the depth of the unit, measured along the length of the baffles 40, was approximately 12 inches, and the proportion of open space in the screens was approximately 40 percent. The invention is not limited in any way to these rates of flow, nor to the dimensions and proportions shown herein, as such figures and proportions are given solely for illustrative purposes.

In addition to being used as an air scrubber, or stack emissions cleanser, or cooling tower, the apparatus of FIG. 1 can also be made into a highly efficient heat exchanger for condensing the steam of an electrical generating plant or the like, by connecting the baffles 40 of each row in series (except for the top baffle 40c), using return elbows at each end, and joining the continuous pipe thus formed to the steam exhaust and condensate return of the power plant system. Steam entering the unit at the next-to-the-top baffle and passing downwardly through successive baffles is condensed out by losing its heat to the water which cascades over the outside of the baffles. In such an installation, the water would be recirculated by pump 32.

Figure 4:
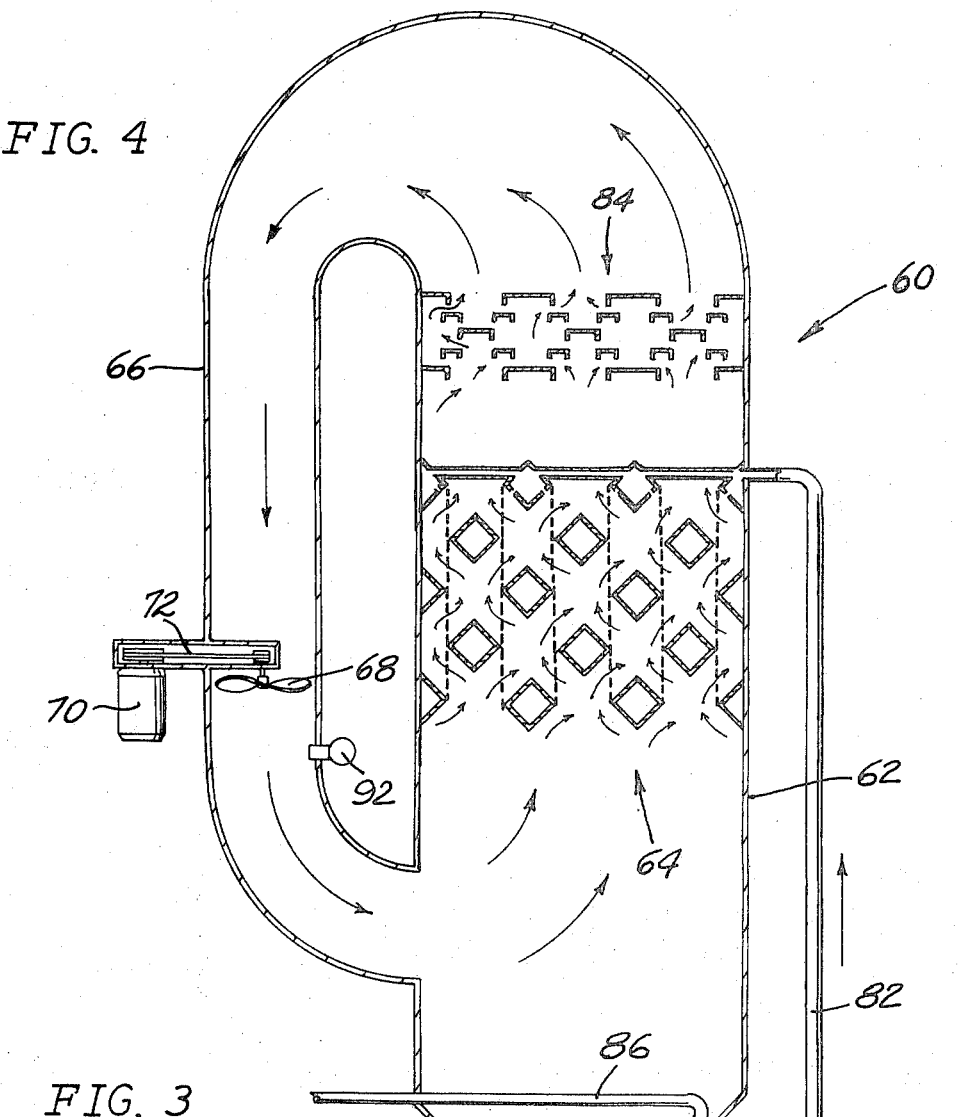
FIG. 4 is a vertical section through another embodiment of the gas-liquid mixing apparatus, showing a closed-circuit system used for chemical reactions.
Figure 3:
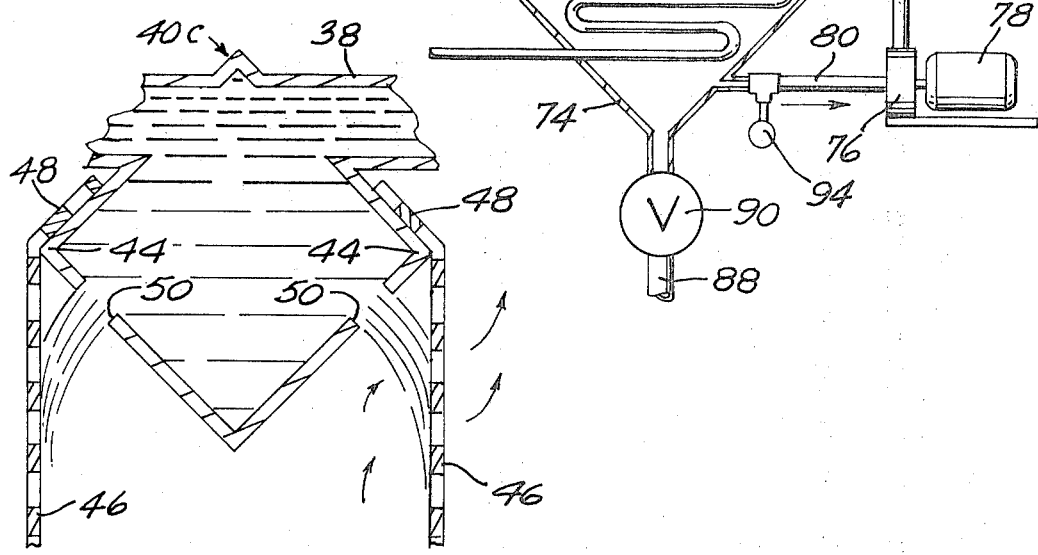
FIG. 3 is a further enlarged section through the top baffle of the cell, through which the liquid is discharged onto the upper ends of the screens.

FIG. 4 shows another embodiment of the gas-liquid mixing apparatus; in this case a closed, recirculating chemical reaction tower using absorption or desorption processes. The apparatus of FIG. 4 is designated in its entirety by the reference numeral 60, and comprises a main housing 62 containing the liquid-gas mixing cell 64, and a return duct 66 which returns the gas from the top of housing 62 to the lower portion thereof. Mounted within the return duct 66 is an axial-flow circulating blower 68 which is driven by a motor 70 and enclosed V-belt 72. The bottom of the housing 62 forms a sump 74, from which the liquid is withdrawn by a pump 76 driven by a motor 78. The intake of pump 76 is connected to the sump 74 by an inlet pipe 80, and the discharge of the pump is sent through a pipe 82 to the top baffle 40c of each row, as in the preceding embodiment. In the open space of the housing 62 above the mixing cell 64 is the de-mister section 84, which removes any fine droplets entrained in the gas.

Liquid circulated by the pump 76 is poured down over the screens and baffles of the mixing cell 64 in the same manner as the preceding embodiment, while gas is circulated in a counter-clockwise direction by the blower 68, passing upwardly through the baffles. The liquid cascading down over the screens and baffles is picked up by the high velocity air stream and broken up into tiny droplets which are churned around in turbulent masses, before dropping to a lower level in the unit. Finally, the droplets, work their way down to the bottom baffles and then drop to the sump 74, where the liquid is picked up and recirculated by the pump 76. If conditions require that heat be added to or removed from the liquid in order to expedite the reaction, such heating or cooling can be done by circulating liquid or appropriate temperature through heat exchange coil 86. When the reaction product in the sump 74 reaches a desired level of concentration, it can be withdrawn through a discharge pipe 88 and valve 90. Additional gas is added to the recirculating gas in the return duct 66 through a supply line 92, to make up for the gas consumed or absorbed in the process, and additional liquid is added to the recirculating liquid in the inlet pipe 80, through a supply line 94. The system can be made to function continuously and automatically, using sensors to detect the concentration of reaction product in the sump, and valves responsive to signals from the sensors for withdrawing the finished product and adding make-up liquid and gas.

The system shown in FIG. 4 can be operated at atmospheric pressure, or at any desired pressure above atmospheric, and because of its high efficiency and compact design, the height of the tower can be held to a minimum. Being completely closed, there is no loss of gas to the atmosphere and no pollution. The tower functions as an absorption and desorption unit, or it may combine the functions of absorber and reactor.

The advantages of the invention are many, It provides a compact, highly efficient gas-liquid mixing apparatus which is relatively inexpensive to build. The unit has a very high gas flow rate, with a high rate of gas absorption or evaporation, and low internal resistance to airflow, with resultant low energy requirement. It can be made for use in scrubbing air or exhaust stack emissions; aeration of water or waste water; as a cooling tower; or for chemical processing.

While I have shown and described certain illustrative embodiments of the invention in considerable detail, it will be understood by those skilled in the art that the invention is not limited to such details, but might take various other forms.

I claim:

1. A gas-liquid mixing apparatus comprising:

an enclosed chamber having a plurality of baffles provided therein, said baffles extending generally horizontally and parallel to one another, and being arranged in rows of vertically spaced and vertically aligned baffles;

said rows of baffles being arranged side-by-side, and the baffles in one row being offset vertically with respect to the corresponding baffles in the next adjacent rows on either side, whereby the baffles in one row are approximately midway between the baffles of the rows on either side;

each of said baffles having downwardly sloping topsides which terminate in lateral extremities, the lateral extremities on one side of the baffles in one row being substantially in the same vertical plane as the lateral extremities on the near side of the adjacent row of baffles;

a screen extending vertically down between adjoining rows of baffles and contacting the lateral extremities of the baffles on opposite sides thereof;

means for supplying liquid to the uppermost horizontal row of baffles and discharging the liquid down onto the baffles and screen; and means for circulating gas upwardly through said apparatus from the bottom thereof to the top, said gas being admitted to said chamber below the level of the bottom baffles and being removed therefrom above the top baffles, and said gas being deflected laterally through said screens by said baffles as it moves upwardly so that the gas follows a serpentine path, passing back and forth through said screen with each change of direction;

said gas stream picking up the liquid cascading down over the screen and baffles and breaking it up into tiny droplets which are churned around in a rolling, tumbling action as the gas ascends and the liquid descends.

2. A gas-liquid mixing apparatus as in claim 1, wherein at least some of said baffles are formed of square tubing having 4 corners which are oriented with one corner at the top, one at the bottom, and two of said corners at the sides forming said lateral extremities, said top and bottom corners being in substantially the same plane, and said two side corners being in substantially the same horizontal plane, and the two top sides of said tubing sloping downwardly at substantially 45 degrees on either side of said top corner.

3. A gas-liquid mixing apparatus as in claim 2, wherein said screen comprises a flat sheet having a plurality of closely spaced holes formed therein, each of said holes forming an orifice through which said gas issues in a high velocity jet that picks up liquid streaming down the surface of the screen and breaks it up into droplets which are carried along on the gas stream.

4. A gas-liquid mixing apparatus as in claim 1, wherein said screen comprises a flat sheet having a plurality of closely spaced holes formed therein, each of said holes forming an orifice through which said gas issues in a high velocity jet that picks up liquid streaming down the surface of the screen and breaks it up into tiny droplets which are carried along on the gas stream.

5. A gas-liquid mixing apparatus as in claim 1, wherein the top baffle in each of said rows is a manifold consisting of a hollow tube, into which said liquid is delivered, said manifold having a plurality of orifices formed therein which discharge streams of liquid onto said screens on opposite sides of the manifold.

6. A gas-liquid mixing apparatus as in claim 5, wherein the bottom of said chamber is a sump into which said liquid falls after passing through said baffles, and said means for supplying liquid comprises a pump having its intake connected to said sump and its discharge connected to said manifold.

7. A closed-circuit, counterflow chemical reaction system comprising:
an enclosed chamber having a plurality of baffles provided therein extending generally horizontally and parallel to one another said baffles being arranged in rows of vertically spaced aligned baffles;
said rows of baffles being arranged side-by-side, and the baffles in one row being offset vertically with respect to corresponding baffles in the next adjacent rows on either side, whereby the baffles in one row are approximately midway between the baffles of the rows on either side;
each of said baffles having downwardly sloping topsides which terminate in lateral extremities, the lateral extremities on one side of the baffles in one row being substantially in the same vertical plane as the lateral extremities on the near side of the adjacent row of baffles;
a screen extending vertically down between adjoining rows of baffles and contacting the lateral extremities of the baffles on opposite sides thereof;
a sump at the bottom of said chamber;
pump means connected to said sump to draw liquid therefrom, said pump means discharging the liquid onto said baffles so that it cascades down through the baffles and collects in the sump;
duct means serially connected to said chamber at one end below the level of the bottom baffles, and at the other end above the level of the top baffles to form a closed circuit;
means for circulating and recirculating the gas around said closed circuit, said gas being admitted to said chamber at the bottom end thereof and being removed therefrom at the top, and said gas being caused to pass through said baffles again and again; and
means for drawing off the liquid reaction products formed by mixing the liquid with the gas when said reaction product has reached a predetermined concentration.

8. A chemical reaction system as in claim 7, which further includes means for supplying make-up gas and make-up liquid to the system as the gas and liquid are used up.

* * * * *